United States Patent
Mogilevsky et al.

(10) Patent No.: US 7,334,236 B2
(45) Date of Patent: Feb. 19, 2008

(54) METHOD FOR SCOPED SERVICES

(75) Inventors: Alex Mogilevsky, Bellevue, WA (US); Mark Douglas Harper, Redmond, WA (US); Kevin Blaine Gjerstad, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 608 days.

(21) Appl. No.: 10/396,805

(22) Filed: Mar. 24, 2003

(65) Prior Publication Data
US 2005/0278727 A1     Dec. 15, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................ 719/328; 719/315
(58) Field of Classification Search ........ 715/761–762, 715/853, 854; 717/101–120; 719/310–332
See application file for complete search history.

(56) References Cited

U.S. PATENT DOCUMENTS

| | | | |
|---|---|---|---|
| 6,675,351 B1* | 1/2004 | Leduc | 715/503 |
| 2003/0065756 A1* | 4/2003 | Carrez | 709/221 |
| 2003/0184584 A1* | 10/2003 | Vachuska et al. | 345/762 |
| 2006/0036682 A1* | 2/2006 | Fletcher et al. | 709/203 |

OTHER PUBLICATIONS

Venners, How to attach a user interface to a Jini Service, Nov. 1999, JavaWorld, pp. 1-12.*
Aschemann et al, A Jini-based Gateway Architecture for Mobile Devices, JIT 99, Sep. 20-21, 1999.*
Suzumura, A Jini-based Computing Portal system, ACM, Nov. 2001, pp. 1-8.*
Hasselmeyer, Managing dynamic service dependencies, 2001, pp. 1-10.*
Grundy et al, Developing Adaptable User Interfaces for Component-based Systems, 2000, IEEE, pp. 1-9.*

* cited by examiner

*Primary Examiner*—William Thomson
*Assistant Examiner*—Diem K Cao
(74) *Attorney, Agent, or Firm*—Merchant & Gould P.C.

(57) ABSTRACT

Described is a mechanism for providing scoped modular services (SMS) through an API. A common set of services is provided by the API that may be enabled or disabled by each component. The services are managed using a property system in the same manner as element properties are used, such as properties relating to text formatting. This helps to ensure fine control and a high degree of customization for a user interface. The use of the services is not limited to editing in the common sense of the word. The SMS is a mechanism for controlling access to implementation of services contained within a tree of components. Services may also be created by developers that are managed by a service manager along with the common services.

20 Claims, 4 Drawing Sheets

METHOD FOR SCOPED SERVICES

FIELD OF THE INVENTION

The present invention relates to software, and more particularly, to providing services through an API.

BACKGROUND OF THE INVENTION

Many software developers build their applications and services from individual software components collectively referred to as components. Components consist of the compiled programming code that contains classes. The components are coded by a developer to provide a defined set of services to clients. Within an application there may be hundreds, or even thousands, of separate components. Additionally, these components may be contained in many different locations within the same program.

Interactive applications typically involve multiple nested controls and/or documents. The set of services available or desirable at any particular point of control hierarchy varies. Functionality of services can vary too. What is needed is a way to leverage the means of definition of control hierarchy to define the set of available services.

SUMMARY OF THE INVENTION

The present invention is directed at providing modular services through an API. A common set of services is provided by the API that may be enabled or disabled by each component. The services are managed using a property system in a hierarchical structure, in the same manner as element properties are used, such as properties relating to text formatting. This helps to ensure fine control and a high degree of customization for a user interface. The use of property system helps to make it possible to control availability and specific implementation of services declaratively via markup language. The Scoped Modular Services (SMS) is a mechanism for controlling access to implementation of services contained within a tree of components. Services may also be created by developers that are managed by a service manager long with the common services.

According to one aspect of the invention, modular services are directed toward a variety of User Interface (UI) scenarios. One of these is the use of modular services relating to editing.

According to another aspect of the invention, the modular definition model is directed at allowing a much higher degree of customization and code reuse as compared to traditional operating system APIs. Such a granular set of reusable services allows for the building of complex controls based on reliable services.

According to yet another aspect of the invention, the model is designed to be reusable and well debugged. In this regard, a mechanism is used for controlling access to implementation of services in a tree of components. A "Service" is defined as a generic object, which can combine state and functionality. Typical use in a component tree is to provide UI functionality which is not tied to particular element (such as text selection or code for moving graphic objects with mouse).

According to still yet another aspect of the invention, services may be managed using a property system in the same manner as element properties, such as properties relating to text formatting. This helps to ensure fine control and a high degree of customization for a user interface. The use of the services is not limited to editing in the common sense of the word. Moving files in file folder is one example of use of a custom set of editing services.

According to yet another aspect of the invention, Scoped Modular Services (SMS) is a mechanism for controlling access to implementation of services in a tree of components. A "Service" is defined as a generic object which can combine state and functionality. Typical use in a component tree is to provide UI functionality which is not tied to particular element (such as text selection or code for moving graphic objects with mouse).

According to yet still yet another aspect of the invention, a mechanism is provided for controlling availability and implementation of services via markup language, which allows combining service with visual design of an application in same markup.

DETAILED DESCRIPTION OF THE PREFERRED EMBODIMENT

The invention will be described here with reference to one example of an illustrative computing environment in which embodiments of the invention can be implemented. Next, a detailed example of one exemplary implementation of the invention, including certain key components, will be described. Alternative implementations may also be included with respect to certain details of the specific implementation. It will be appreciated that embodiments of the invention are not limited to those described here.

Illustrative Computing Environment

Figure 1:
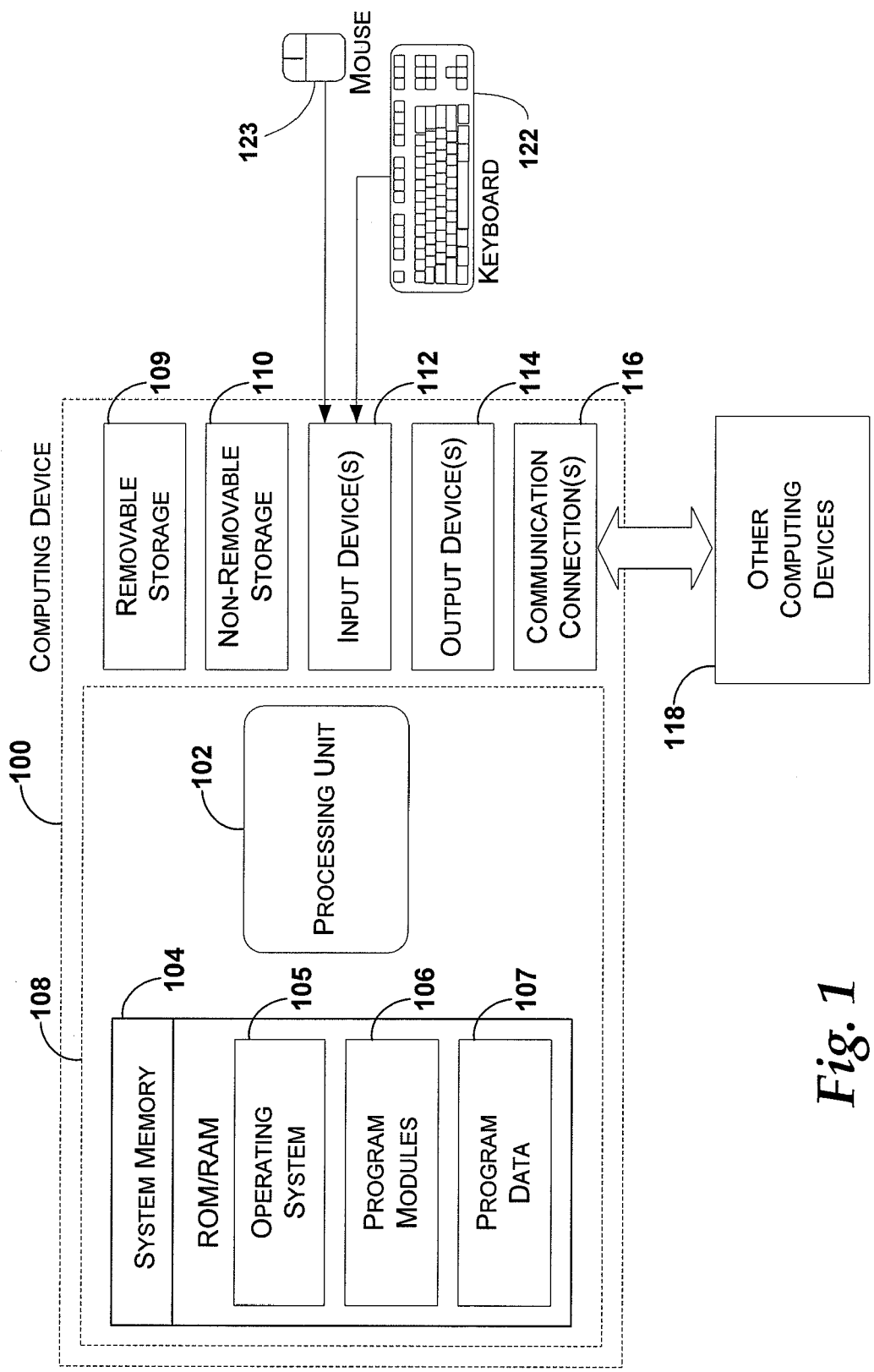
FIG. 1 is a functional block diagram that illustrates a computing device that may be used in implementations of the present invention.

FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, scanner, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media The term computer readable media as used herein includes both storage media and communication media Illustrative Implementation The present invention is directed at providing scoped modular services (SMS) in an hierarchical structure of components. A set of services is provided by the API that may be enabled or disabled by each component. The services may be managed using a property system in the same manner as element properties are used, such as properties relating to text formatting. This helps to ensure fine control and a high degree of customization for a user interface. The use of the services is not limited to editing in the common sense of the word. The SMS is a mechanism for controlling access to implementation of services contained within a tree of components.

Services may be created by application developers or provided by operating system. Services provided by OS are referred to as "common services". Common services can be enabled, disabled or replaced by using the same mechanism.

Figure 2:
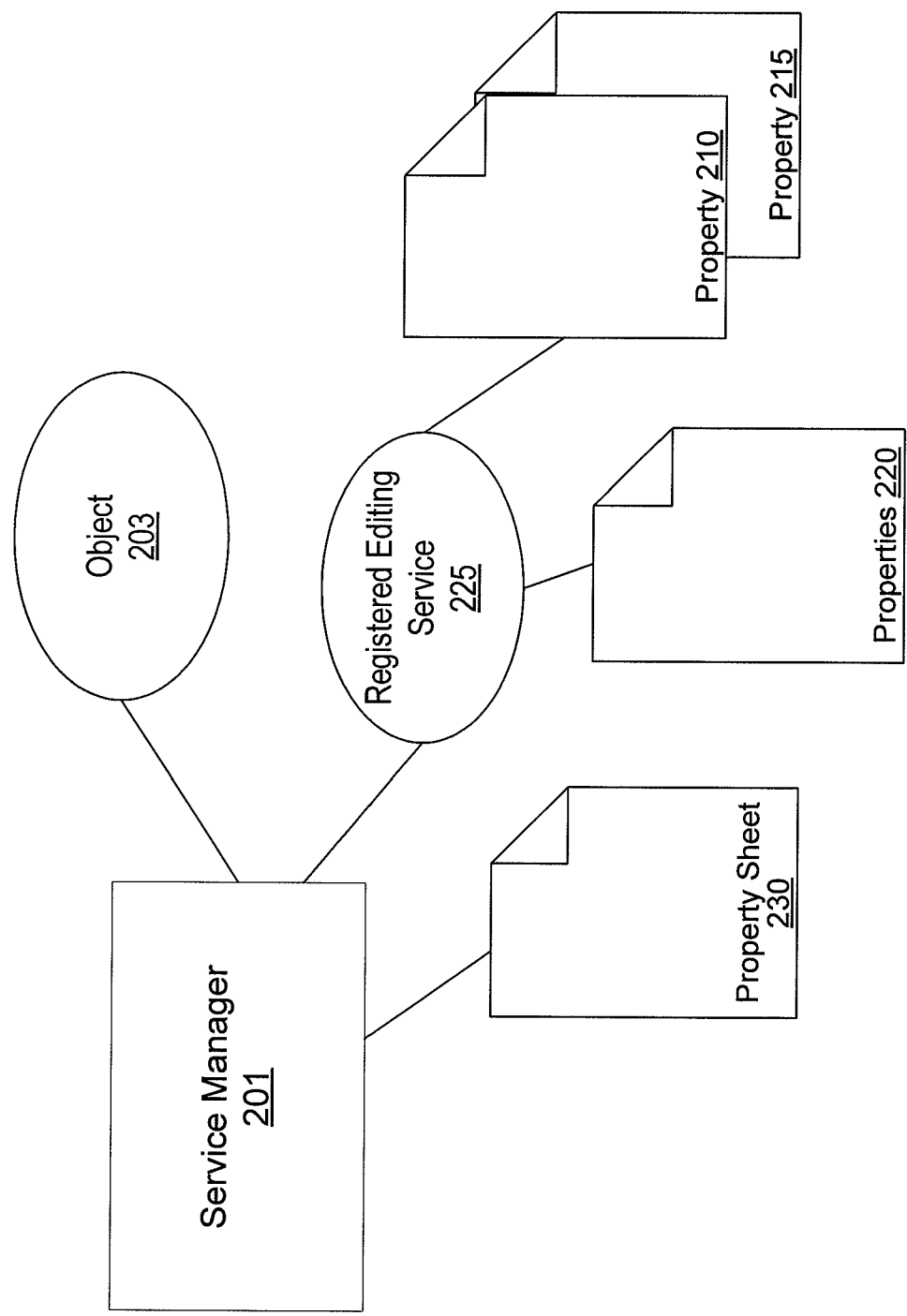
FIG. 2 is a functional block diagram generally illustrating registering an object or class.

FIG. 2 is a functional block diagram generally illustrating registering an object or class, in accordance with aspects of the invention.

An object or a class may become a SMS (225) through registration with service manager 201. Registration makes Service Manager 201 aware of the service type. Upon registering object 203, service manager 201 associates two properties with the object. One-property (210) represents the service type and the other property (215) controls the service's availability. According to one embodiment, the service's availability is set to enabled by default. The availability of the service may be enabled and disabled without needing to recreate it or to reset its internal state.

The following is exemplary code for registering a service with service manager 201:

```
public static readonly DynamicProperty
TextSelectionProperty
    ServiceManager.DynamicPropertyForService(
        typeof (TextSelection), --Type of service (identifies the service)
        true, Create the property (if false then returns an existing
propterty if true then property is created)
        "TextSelection", --The name of service
        null, --Enabled Callback (a delegate to call when services is
enabled or disabled)
        true, --if true, the service is enabled by default
        typeof (CommomServices) , --Class that registed the service
        (int) Hint.TextSelectionPropertyHint -Owner relative hint
(for optimization)
        );
public static readonly DynamicProperty
TextSelectionEnabledProperty =
    ServiceManager.EnabledPropertyForService(
        typeof (TextSelection)
        );
```

According to one embodiment, services are registered in a static constructor, which makes them immediately runtime. It is also possible to register some services on demand, thus saving startup time.

After registration, the properties (220) associated with service 225 may be used to access, or set, a property on element tree relating to the newly registered service. The properties associated with the service relate to the service being provided. For example, the properties may include items such as: size, location, active attributes, behavior, and the like.

Once the service is registered with service manager 201, the registered service may be accessed. The following is an exemplary code block for accessing a service using the property system and properties associated with the particular service:

```
TextSelection selection =
    (TextSelection)
    testbox. GetValue (TextSelectionProperty);
```

The property may be set in advance, or the property may specified in some other way. One exemplary way to specify the property is as follows:

```
textbox SetValue(TextSelectionProperty,
    new MyTextSelection(textbox));
```

Another way that the property may be specified is as a type in an XML document, as follows:

Or a default implementation may be used.

Another exemplary registration of a service with service manager 201 is as follows.

```
namespace XXX Base
{
public class ServiceManager
{
    public static DynamicProperty
        RegisterService (
```

-continued

```
        string name,
            \\Property name
        PropertyFlags flags,
            \\Property flags
        Type serviceType,
            \\Service type
        Type defaultService,
            \\Default implentation
        ICollection groupsInclude,
            \\Service groups to include (array of strings)
        ICollection groupsExclude,
            \\Service groups to exclude (array of strings)
        DynamicProperty enableProperty,
            \\Enabling property
```

ServiceManager 201 is configured to know which property to use to enable the service, and it can build property sheet 230 to switch to a mode. Modes are defined as collections of services.

Once a service is registered (such as service 225), the service can be set on any element, enabled, disabled, set directly, inherited, set via property sheets, from code or markup which are all advantages of a property system. The following is an illustrative example that is located somewhere within the related application code.

EXAMPLE

```
    public static readonly DynamicProperty
    PolarMoveBehaviorProperty =
        XXX Base.ServiceManager RegisterService (
            "PolarMoveBehavior",
                \\Property name
            PropertyFlags.Sheet | PropertyFlags.Inherit,
                \\Property flags
            typeof (IPolarMoveBehavior),
                \\Service type
            typeof (DefaultPolarMoveBehavior),
                \\Default implementation
            new String [ ] = { "DesignMode", "Polar2D" }
                \\Service groups to include
            new String [ ] = { "TextEditor",
            DynamicProperty PolarMoveEnable,
    {
    public static DynamicProperty PolarMoveEnableProperty =
        PropertyManager.RegisterProperty (
            "PolarMoveEnable",
            PropertyFlags.Sheet | PropertyFlags.Inherit,
            typeof (bool),
            true);
    \\Other properties may be defined specific to this service
```

The following code is an illustrative example of setting a value associated with the service.

```
    element.SetValue(PolarTools.PolarMoveBehaviorProperty,
    "MyPolarMoveBehavior");
    element.SetValue(PolarTools.PolarResizeEnableProperty,
    true);
```

Or in markup

```
    <Element
    PolarTools.PolarMoveBehaviorProperty="MyMoveBehavior"
        PolarTools.PolarResizeEnableProperty=true>
```

The following code is an illustrative example of accessing (getting) a value associated with the service.

```
    polarMoveBehavior = (IPolarMoveBehavior)
        element GetValue(PolarTools.PolarMoveBehaviorProperty);
```

An instance of the service is created when an associated property is set locally which limits scope of the service. If this is not the desired effect then the services should be enabled and disabled rather then set locally.

If the default is used, then the default service is created by service manager 201. As the services and properties are contained within a tree system using inheritance, the services obtain the default service from its parent service container, if defined (e.g. designer host).

A set of commonly used services is defined by the system. The services are, therefore, available to any document or application unless the services are explicitly overridden. According to one embodiment of the invention, this core set of commonly used services are provided automatically at the root of element tree.

Common services may be provided by an API. The common services include those services that are determined to be used frequently. In other words, the common services are the services that are determined to be the core services relating to the interface. According to one embodiment, these services include selection, edit, resize, move, rubberband, rotation, align, snap, undo, annotation, adorners, and the like.

The common services may be accessed as element properties. There may be additional services provided by the host via a service provider. Such services may be available programmatically and can also be overridden if a corresponding property is defined. According to one embodiment of the invention, the most commonly used services are included in the core of the OS.

In some scenarios, a host application (potentially using a different technology) may provide additional services. An example may be a form editor providing a different selection service from the available common services. In these cases, the service manager searches for a service in the host service provider before using the default services (or failing a GetService request if no default service is available).

Some services function with the use of base services. For example, according to one embodiment TextSelection uses the base service "RootSelection." The common services are globally defined.

Inheritance

As with other properties, properties associated with the modular services are inherited according to an element hierarchy. For example, if a text color is set to red within a textbox, its content becomes red. If the textbox contains nested elements (e.g. paragraphs), the nested elements inherit the text color from the parent element (textbox), and the text within the nested elements will render red unless a different value is specified explicitly within that element.

Figure 3:
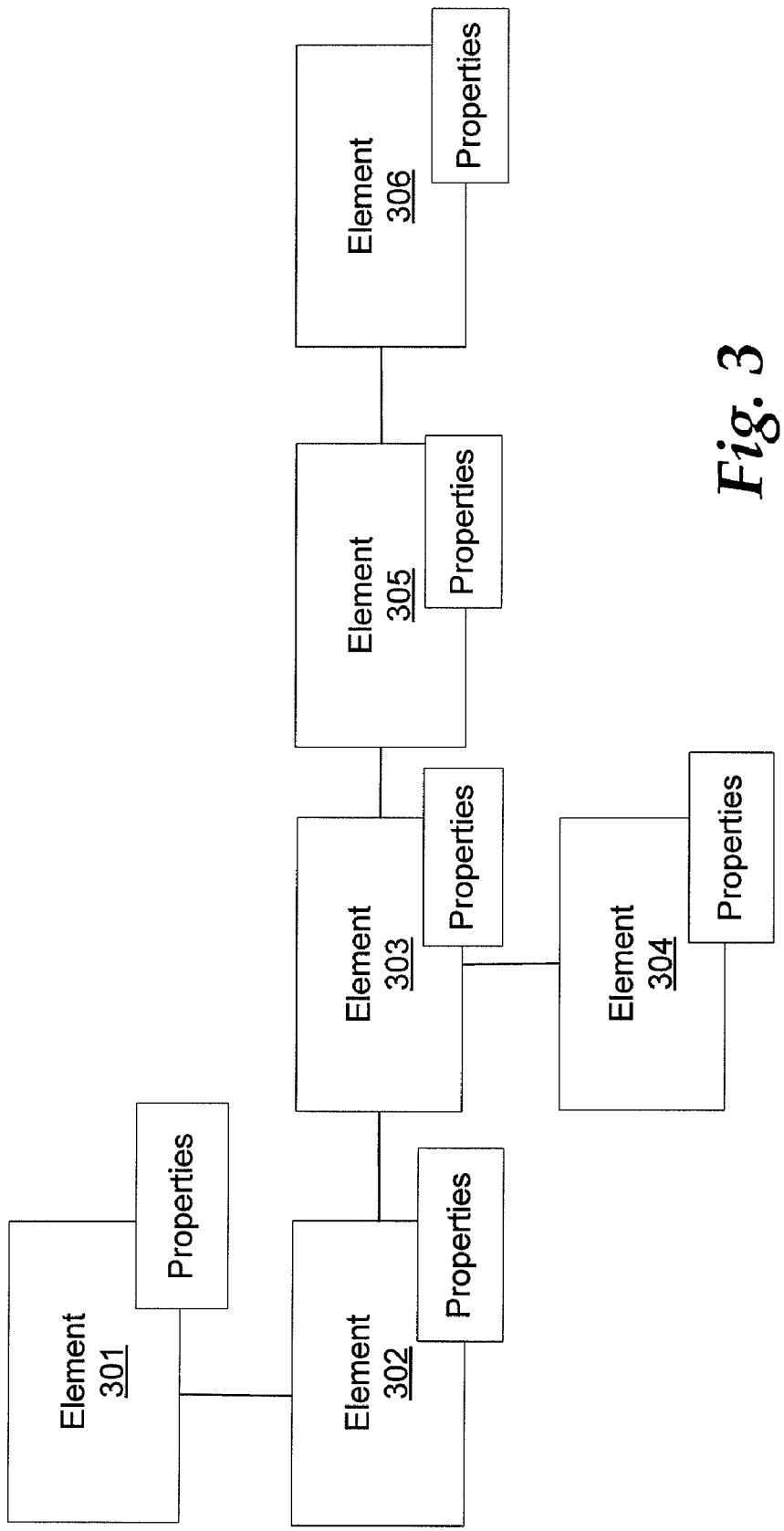
FIG. 3 illustrates a set of elements arranged in a hierarchical structure.

The same inheritance rules apply to services. For example, if the TextSelectionProperty is retrieved from a nested element, its value will be retrieved from the parent. FIG. 3 illustrates a set of elements arranged in a hierarchical structure. Properties contained within element 301 are inherited by all of the elements below. In this particular case, elements 302-306 inherit the properties of element 301.

Enabling and Overriding of Services

The enabling property allows toggling availability of a service without a need to replace its implementation. In the following example, textboxes A and C have selection enabled, and are therefore editable, but textbox B is not enabled making its text non-selectable, and rather performing just as a label.

```
<Document TextSelectionEnalbed = true TextSelection =
"TextSelection">
This text is editable, because selection is enabled in the
document
    <TextBox ID="A">This text is editable, because
    selection services is enabled on the parent of this
    textbox.<\TextBox>
    <TextBox ID="B">TextSelectionEnabled = false<This
    text is not editable, because services is
    disabled on this textbox
    <TextBox ID="C">TexsSelectionEnabled = true<This
    text is editable, and it can be selected together with
    text outside the textbox B (if multiple text selection is
    implemented by TextSelection class)<\TextBox>
    <\TextBox>
<\Document>
```

Element types may also implicitly enable services that are generally used for their functionality. For example, a textbox typically enables text selection. Text selection, however, may be disabled, as seen in the example above.

Some services typically only have one instance. Such services typically are associated with a physical device, such as keyboard or mouse. Some services may have multiple instances, but only one instance that is in an active state. One such example includes active selection which may be shown as text highlight or a blinking caret. The service manager keeps track of such services and helps to ensure the desired behavior.

Reuse of Modular Services for Control Implementation

An advantage of the modular services system is availability of services outside of the traditional "edit mode", which implies that all functionality is either enabled or disabled. In this system, individual services can be used outside of a typical editing scenario.

For example, the same move service can be used to move elements in a form editor as well as used to move file icons in file folder. At the same time, the selection feedback may be different. For example, the selected file icons are shadowed instead of having resize handles. The semantics of the operations may also be domain-specific. For example, the delete button in a file folder moves a file to the recycle bin, rather than deleting the icon image.

This granular set of reusable services helps to allow building complex controls based on a set of reliable "parts." In other words, the services are designed to be reusable and well debugged (the unfortunate alternative in traditional systems is to re-implement common features when needed; although seemingly simple the features end up having subtle differences. For example, the move behavior appears to be just reacting to the move of the mouse, but it must also react to the keyboard, its behavior at a boundary of a move area differs from product to product, it may also be able to react to voice commands, and the like.

The Modular Services architecture provides many advantages. For example, the architecture adds flexibility of controlling availability and implementation of services in a tree of components and the architecture takes advantage of a rich property system, making customizing the UT behavior of an application as easy as setting formatting properties.

The architecture can help to blur the distinction between interactive runtime and design mode. It is possible to use this architecture in a UI platform to remove the line between interactive runtime and design mode. Features are available as services, which can be enabled, disabled or replaced using a property system. Modes can still be available, implemented as known property sets. For example, switching a document in design mode can be done by applying a "design-mode" property sheet.

Exemplary Operation of the Illustrative Implementation

Figure 4:
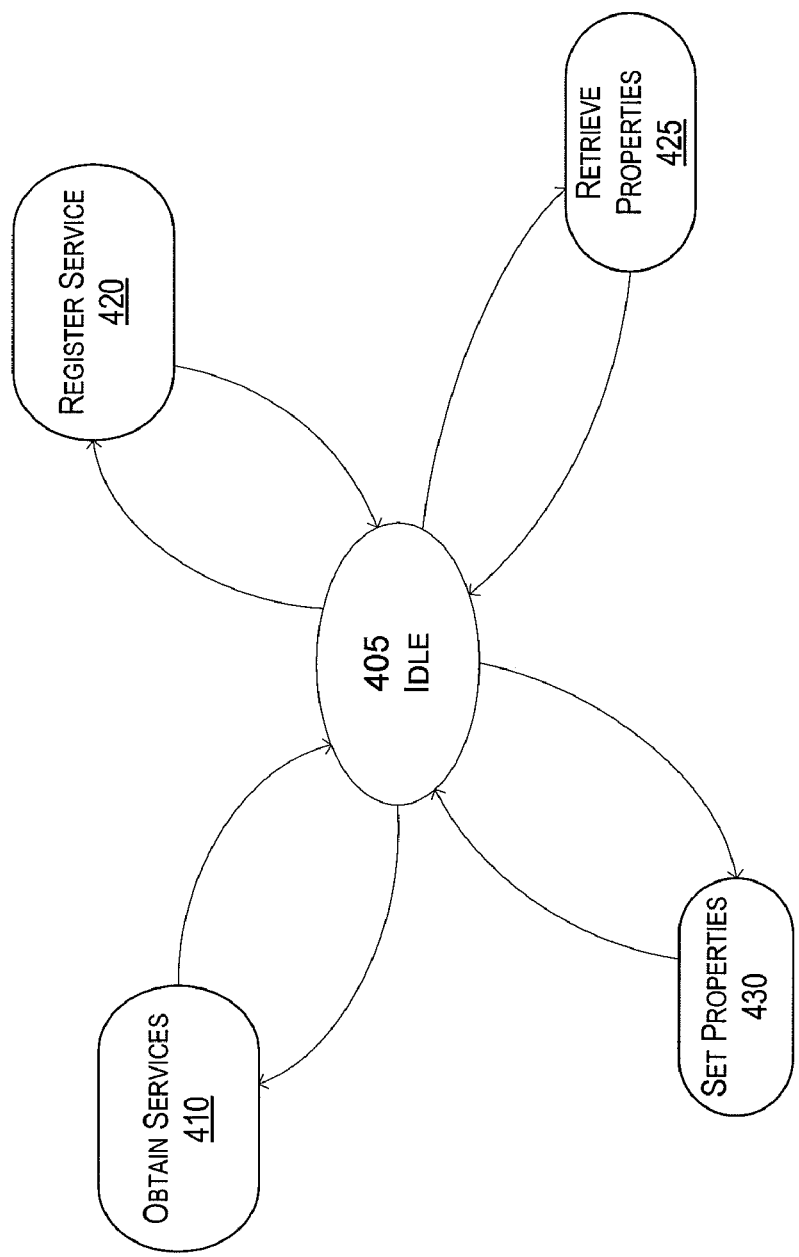
FIG. 4 illustrates a logical state diagram generally illustrating a process for an application using the scoped modular services, in accordance with aspects of the invention.

FIG. 4 illustrates a logical state diagram generally illustrating a process for an application using the scoped modular services, in accordance with aspects of the invention.

At state 410, the available services may be obtained. The services may include the common services as well as the registered services. As discussed above, the services are controlled by setting properties associated with the services. The available services allow the application to share code within the services, as well as to fine tune the services within different controls. The functionality of the service does not need to be built in at run time. All of the controls have the services available to them. It does not matter what level the service is at.

Sate 420 illustrates registering a service with the service manager so that it may be used by the elements within the tree. Once registered, the service may be managed along with the set of common services available through the API.

At state 430, the properties may be set that are associated with a service to configure its behavior. The properties may be set and changed at each level of the tree. For example, a property may be set at a lower level within the tree even though the property is not set at a higher level within the tree.

Properties may also be retrieved. State 425 illustrates retrieving properties associated with an element within the tree. An application may use the retrieved properties according to its needs. For example, the application may use the retrieved properties to set other properties within other elements.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing scoped modular services to controls, comprising:

providing services in a hierarchical structure of components, wherein the services are reusable program modules configured to provide user interface functionality that is not tied to a particular component; wherein the hierarchical structure of components provides an inheritance model according to the component hierarchy;

registering and accessing the services with an Application Programming Interface (API); and associating properties with the services that are used in controlling availability, implementation and scope of the services; wherein the services are configured to be individually enabled or disabled for each of the controls and controlling behaviors associated with the services further comprises setting a property associated with the service; wherein the properties associated with the services are inherited according to the component hierarchy.

2. The method of claim 1, wherein providing the services further comprises registering a service to become a registered service.

3. The method of claim 2, wherein registering the services further comprises utilizing a service manager in registering the service.

4. The method of claim 3, further comprising retrieving a property associated with the service.

5. The method of claim 2, wherein setting the property associated with the service further comprises enabling the service by setting the property.

6. The method of claim 2, wherein setting the property associated with the service further comprises defining the service by setting the property.

7. The method of claim 2, wherein setting the property associated with the service further comprises setting the property in advance of using the service.

8. The method of claim 7, further comprising inheriting the behaviors associated with a service that is specified within the tree.

9. The method of claim 8, wherein the properties associated with the service further comprises setting the properties at any level within the hierarchical tree.

10. The method of claim 8, further comprising providing a default implementation of a service.

11. The method of claim 2, wherein setting the property associated with the service further comprises setting the property using a markup language.

12. The method of claim 2, wherein setting the property associated with the service further comprises adjusting a run-time mode and a design-time mode.

13. The method of claim 2, wherein registering and accessing the services further comprises associating the services within a hierarchical tree.

14. A computer-readable storage medium having computer instruction encoded thereon for providing scoped modular services to controls, comprising:

providing services in a hierarchical structure of components, wherein the services are reusable program modules configured to provide user interface functionality that is not tied to a particular component; wherein the hierarchical structure of components provides an inheritance model according to the component hierarchy;

registering and accessing the services with an Application Programming Interface (API); and associating properties with the services that are used in controlling availability, implementation and scope of the services; wherein the services are configured to be individually enabled or disabled for each of the controls through the API, and controlling behaviors associated with the services further comprises setting a property associated with the service; wherein the properties associated with the services are inherited according to the component hierarchy.

15. The computer-readable medium of claim 14, wherein providing the services further comprises providing common services and registered services.

16. The computer-readable medium of claim 15, wherein providing the registered services further comprises utilizing a service manager.

17. The computer-readable medium of claim 15, further comprising retrieving a property associated with the service.

18. The computer-readable medium of claim 15, wherein setting the property associated with the service further comprises enabling and disabling the service based on the property.

19. The computer-readable medium of claim 18, further comprising providing inheritance of the behaviors within a hierarchical tree.

20. The computer-readable medium of claim 18, wherein the properties associated with the service are selectable at least one level within the hierarchical tree.

* * * * *